United States Patent [19]

Handlin, Jr. et al.

[11] Patent Number: 5,446,104

[45] Date of Patent: Aug. 29, 1995

[54] CROSSLINKABLE LOW VISCOSITY STAR POLYMER BLENDS

[75] Inventors: Dale L. Handlin, Jr., Houston; James R. Erickson, Katy; David R. Stewart, Richmond, all of Tex.

[73] Assignee: Shell Oil Company, Houston, Tex.

[21] Appl. No.: 90,852

[22] Filed: Jul. 12, 1993

[51] Int. Cl.⁶ ............................................. C08F 297/04
[52] U.S. Cl. .................... 525/314; 525/332.2; 525/331.9; 525/99; 524/81
[58] Field of Search .................. 525/314, 332.2, 331.9, 525/99; 524/81

[56] References Cited

U.S. PATENT DOCUMENTS

| | | | |
|---|---|---|---|
| 4,010,226 | 3/1977 | Crossland et al. | 260/880 B |
| 4,237,245 | 12/1980 | Halasa et al. | |
| 4,391,949 | 7/1983 | St. Clair | 525/99 |
| 4,444,953 | 4/1984 | St. Clair | 525/98 |
| 4,925,899 | 5/1990 | Rendina et al. | 525/314 |
| 5,104,921 | 4/1992 | Erikson et al. | 524/274 |
| 5,149,895 | 9/1992 | Coolbaugh et al. | |
| 5,210,359 | 5/1993 | Coolbaugh et al. | |
| 5,229,464 | 7/1993 | Erikson et al. | 525/314 |
| 5,242,026 | 9/1993 | Erikson et al. | 525/331.9 |

FOREIGN PATENT DOCUMENTS

0396780A1 11/1990 European Pat. Off. .
0441485A2 8/1991 European Pat. Off. .

OTHER PUBLICATIONS

Journal of Applied Polymer Science (Abstract) vol. 23, No. 11, Jun. 1979 pp. 3311–3321.
"Concentration and Molecular Weight Dependence of Viscoelastic Properties in Linear and Star Polymers" by Raju et al., *Macromolecules*, 1981, 14, pp. 1668–1676.
"Rheological Properties of Linear and Branched Polyisoprene" by Graessley et al., *Macromolecules*, vol. 9, No. 1, Jan.–Feb. 1976, pp. 127–141.

*Primary Examiner*—James J. Seidleck
*Assistant Examiner*—W. Robinson H. Clark
*Attorney, Agent, or Firm*—Donald F. Haas

[57] ABSTRACT

A crosslinkable low viscosity short arm star polymer blend made by anionically polymerizing a conjugated diene and, optionally, a vinyl aromatic hydrocarbon to form living polymer arms and coupling said arms with a coupling agent for star polymers and blending said star polymer with a compatible organic liquid such that the amount of organic liquid in the blend ranges from 5 to 50 percent by weight. A preferred embodiment is an epoxidized version which is selectively epoxidized at the exterior sections of the polymer to enhance the crosslinkability of the polymer.

8 Claims, 1 Drawing Sheet

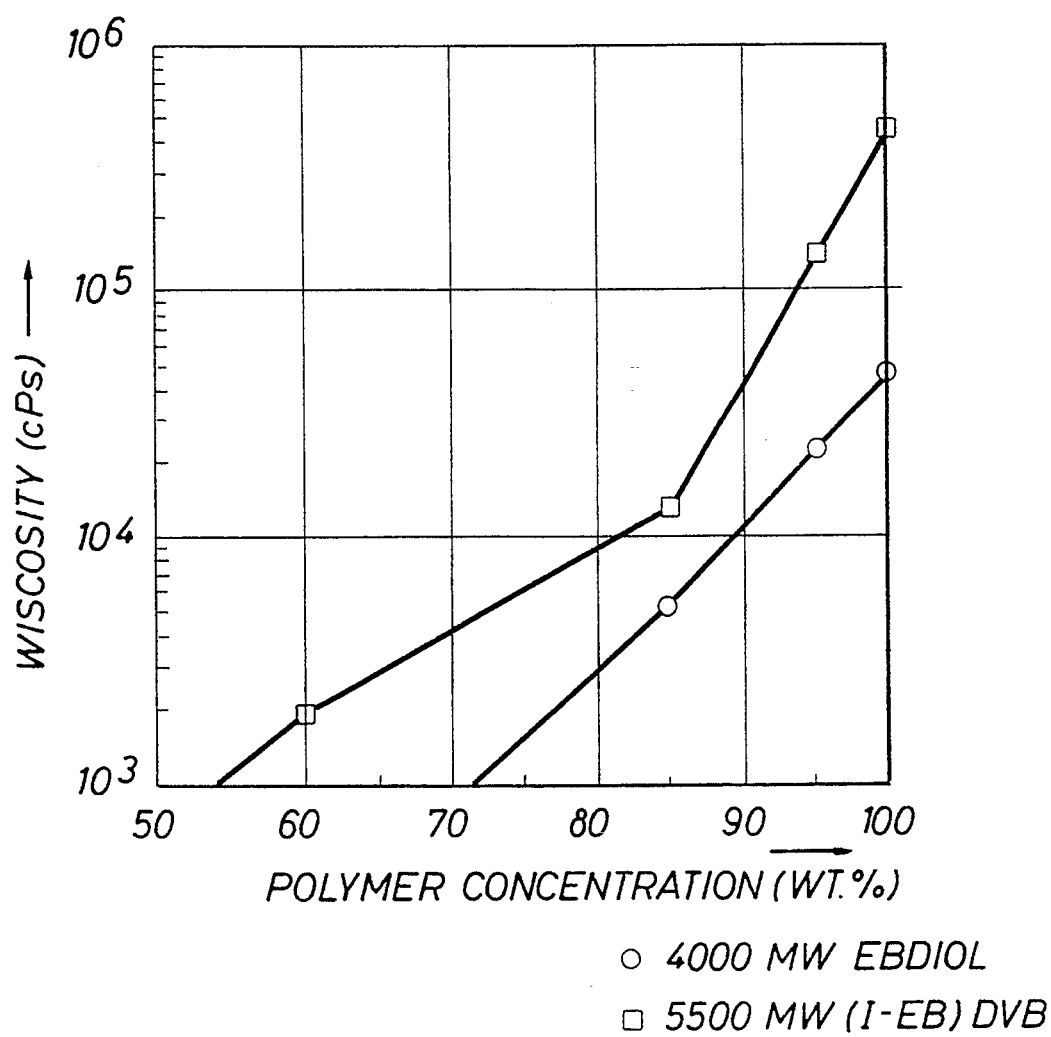

CROSSLINKABLE LOW VISCOSITY STAR POLYMER BLENDS

BACKGROUND OF THE INVENTION

This invention relates to crosslinkable blends of low viscosity short arm star polymers of conjugated dienes and, optionally, vinyl aromatic hydrocarbons. More particularly, the invention relates to functionalized crosslinkable blends of low viscosity short arm star polymers, especially hydroxy and epoxy functionalized and crosslinkable low viscosity short arm star polymers.

Block copolymers can be obtained by anionic polymerization of a conjugated diene, optionally with a vinyl aromatic hydrocarbon, by using an organic alkali metal initiator. One commonly used method involves first polymerizing monomer A, such as styrene, to form a living polymer block. Then monomer B, such as butadiene or isoprene is polymerized at the end of the A block to form an A-B block polymer which is still living. This A-B block polymer is referred to as a diblock polymer or, when discussed in the context of a branched or star polymer, as a block polymer arm or living polymer arm. These block polymer arms are then coupled together by the addition of a coupling agent which reacts with two or more of the arms to form one compound. If two arms react, then the polymer will have the structure A-B-X-B-A where X is the coupling agent. Since X is only one molecule and is relatively small, the polymer looks and acts like a linear A-B-A block copolymer. This process is generally described in U.S. Pat. Nos. 3,595,941, 3,468,972 and 4,096,203.

It is well known that the viscosity of such linear polymers can be lowered by adding solvents or other low molecular weight organic liquids. There are advantages in many applications such as paint and coatings to having a lower viscosity for the polymer. The amount of volatile organic compounds (VOC's) must be limited in most coatings and adhesives. Therefore, it is highly desirable to achieve viscosity reduction with minimal added VOC's. Unfortunately, the presence of reactive diluents, etc. also dramatically decreases the overall molecular weight of the polymer blend. A reduction in molecular weight is particularly undesirable when the intent is to produce a crosslinkable polymer composition. A higher molecular weight polymer requires fewer reactions to cure or crosslink. Higher molecular weight polymers have a smaller number of molecules per unit mass and this means that there are more reactive double bonds per molecule per unit mass which are available to participate in the crosslinking reaction. Further, if large amounts of solvents or reactive diluents have to be added to decrease the viscosity, the cost goes up the VOC increases and possibly the efficiency of the radiation crosslinking may be adversely affected by the solvent.

Star polymers are also crosslinked by exposure to radiation. They are produced by a coupling process. The coupling agents used are polyfunctional coupling agents or monomers. Coupling agents such as divinylbenzene, may polymerize or oligomerize as well as react with living chain ends. The results of these two types of reactions is the formation of a star shaped polymer having up to 40 or 50 arms attached to a central core which is composed principally of the coupling agent.

Star polymers generally have relatively high molecular weights because of the number of polymer arms present in the molecule. Because of the number of polymer arms, there are quite a number of potential crosslinking sites in the molecule as well. It would be advantageous to provide a crosslinkable star polymer composition with a relatively low viscosity which was able to maintain its relatively high molecular weight without the addition of large amounts of solvent or co-reactive diluents. The present invention provides such a polymer and functionalized versions thereof.

SUMMARY OF THE INVENTION

Provided herein is a crosslinkable low viscosity star polymer composition made by blending a small amount of a compatible organic liquid into a short arm star polymer made by anionically polymerizing a conjugated diene and, optionally, a vinyl aromatic hydrocarbon to form living polymer arms and coupling the arms with a coupling agent for star polymers wherein the molecular weight of the arms in the polymer ranges from 1000 to 15,000. The invention also relates to functionalized versions of such polymers wherein functionality selected from the group consisting of epoxy, hydroxy, carboxy, amine and phenolic is incorporated into the polymer. The preferred amount of organic liquid blended with the polymer is from 5 to 50 percent by weight. The compatible organic liquid may be a solvent, reactive diluent oil or oligomers.

A highly preferred embodiment of the present invention is a crosslinkable low viscosity epoxidized short arm star polymer blend made by first making the polymer described above, epoxidizing that polymer and blending it with the compatible organic liquid. It is most preferred to provide selectively epoxidized star polymers wherein the epoxidation on the polymer is selectively located on the exterior blocks of the polymer to provide crosslinking sites in a location where they are more easily and more readily available for crosslinking reaction than if they were on the interior of the polymer molecule.

DESCRIPTION OF THE DRAWINGS

FIG. 1 is a plot of viscosity versus the percentage of polymer in the blend for a blend of a hydrogenated butadiene diol linear polymer and a star diene copolymer. The data is described in Example 3.

DETAILED DESCRIPTION OF THE INVENTION

Polymers containing ethylenic unsaturation can be prepared by copolymerizing one or more polyolefins, particularly a diolefin, by themselves or with one or more alkenyl aromatic hydrocarbon monomers. The copolymers may, of course, be random, tapered, block or a combination of these, as well as linear, star or radial.

The polymers containing ethylenic unsaturation or both aromatic and ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like, but it also may be recovered as a liquid such as in the present invention. Polymers containing ethylenic unsaturation and polymers containing both aromatic and ethylenic unsaturation are available commercially from several suppliers.

In general, when solution anionic techniques are used, copolymers of conjugated diolefins and alkenyl aromatic hydrocarbons are prepared by contacting the monomer or monomers to be polymerized simultaneously or sequentially with an anionic polymerization initiator such as group IA metals, their alkyls, amides, silanolates, napthalides, biphenyls or anthracenyl derivatives. It is preferred to use an organo alkali metal (such as sodium, lithium, or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

As discussed above, the star polymers are made by coupling polymer arms using a polyfunctional coupling agent or coupling monomer. A preferred coupling agent is a polyalkenyl aromatic coupling agent such as those described in U.S. Pat. Nos. 4,010,226, 4,391,949 and 4,444,953, which are herein incorporated by reference. U.S. Pat. No. 5,104,921, which is also herein incorporated by reference, contains a complete description of such polyalkenyl aromatic compounds at columns 12 and 13. Divinyl aromatic hydrocarbons containing up to 26 carbon atoms per molecule are preferred and particularly divinyl benzene in either its meta or para isomer and commercial divinyl benzene which is a mixture of said isomers is also quite satisfactory. The coupling agent is preferably added to the living polymer after the polymerization is substantially complete. The amount of coupling agent varies between wide limits but preferably at least one equivalent is used per equivalent of unsaturated living polymer. The coupling reaction is generally carried out in the same solvent as for the polymerization reaction. The temperature varies between wide limits, for example, from 25° C. to 90° C.

We have discovered that short arm star polymers are particularly advantaged when used with compatible organic liquids to form high concentration blends. The preferred short arm star polymers for use herein have an arm molecular weight of from 1000 to 15,000. It should not be less than 1000 because the ability to crosslink very short arm stars is poor, and, surprisingly, polymers with arms shorter than 1000 have higher viscosities than those with longer arms. The arm molecular weight should not be more than 15,000 because viscosity rises rapidly as the arms become entangled.

In order to achieve the advantages of the present invention, blends of these star polymers with compatible organic liquids are made such that they contain from 50 to 95 weight percent polymer (5 to 50 percent organic liquid). If the amount of polymers is less than 50 weight percent, the VOC is very high and the molecular weight of the polymer blend has dropped so low that crosslinking is much harder to achieve, i.e., the advantages of having many arms with many crosslinking sites is canceled out by the presence of a large amount of organic liquid. If the amount of polymer is more than 95 percent, then the decrease in viscosity is insufficient to allow ready processing as a liquid. Preferably, the amount of polymer should range from 60 percent to 90 percent (10 to 30 percent organic liquid) because this provides the best balance of lower viscosity and higher molecular weight. The highest viscosity dropoff rate occurs in the range of addition of organic liquid of 5 to 15 percent and is thus most preferred. The lowering of the viscosity without appreciably effecting molecular weight is very dramatic for star polymers as shown by FIG. 1 and explained in more detail in the examples.

A wide variety of organic liquids are suitable for achieving the advantages of this invention. The organic liquids must be compatible with the polymer used. This means they form a clear solution with no visible haze or layering before curing. For example, solvents, tackifying resins, reactive diluents and oils may be used. Some of the solvents which may be used in the present invention are described below as are some of the reactive diluents. Tackifying resins and oils which may be included are those which are commonly used in coating, sealant and adhesive applications including this type of polymer. For example, Zonatac 105 Lite, a polyterpene tackifying resin from Arizona Chemical or Piccolyte S-10 polyterpene resin from Hercules.

Preferred block copolymers which are useful in the present invention have the formula $$(A\text{-}B\text{-}A_p)_n\text{-}Y\text{-}(A_q\text{-}B)_m$$

wherein Y is a coupling agent or coupling monomers, and wherein A and B are polymer blocks which may be homopolymer blocks of conjugated diolefin monomers, copolymer blocks of conjugated diolefin monomers or copolymer blocks of diolefin monomers and monoalkenyl aromatic hydrocarbon monomers. These polymers are described in more detail in U.S. Pat. No. 5,229,464, entitled "Viscous Conjugated Diene Block Copolymers," which is herein incorporated by reference. Generally, the A blocks should have a greater concentration of more highly substituted aliphatic double bonds than the B blocks have. The A blocks will have a greater concentration of di-, tri-, or tetra-substituted olefenic double bonds. For example, in one embodiment, the A blocks will have a greater number of tertiary (trisubstituted) unsaturation (TU) sites per unit of block mass than the B blocks, where a TU site is defined to be an olefinic double bond (ODB) between a tertiary carbon atom and either a primary or secondary carbon atom. The A blocks have a molecular weight of from about 100 to about 3,000 and the B blocks have a molecular weight of from about 1000 to about 15,000. n is greater than 0, m is greater than or equal to 0, and n+m ranges from 3 to 100. p and q may be 0 or 1. When either p or q or both are 1, extra TU sites are available in the interior of the polymer chain. By way of example, polymer block A could be polyisoprene having about 14.7 milliequivalents of residual ODB's per gram, many of which would be TU sites (up to 14.7 Meq TU/g), and polymer block B could be polybutadiene having 18.5 milliequivalents of residual ODB's per gram, none of which would be TU sites (0 Meq TU/g). These polymers have exterior crosslinking sites which enhance the crosslinking ability of these polymers. They may be functionalized at these sites to further enhance the crosslinking ability.

When these polymers are epoxidized, whether they are hydrogenated or not, it is preferred that the epoxidation take place only to the extent that 0.1 to 3 milliequivalents of epoxide per gram of polymer (0.1 to 3 Meq epoxide/g) are generated. Hence, the preferred epoxidized polymer has an epoxide equivalent weight of between 10,000 and 333. The polymers may then be crosslinked through at least some of the epoxy functionality, preferably, by radiation.

In general, it is preferred that the polymer have exterior A blocks which contain more highly substituted aliphatic double bonds than interior B blocks which should contain less highly substituted double bonds. One preferred specific example of this is the case where the A blocks are formed from isoprene monomer and the B blocks are formed from butadiene monomer. However, another special case is the situation wherein the A blocks are formed from 1,4 addition of butadiene monomer and the B blocks are formed from 1,2 addition of butadiene monomer. Another special case is wherein the A blocks are formed from 2,3-dimethyl butadiene (tetra-substituted) and the B blocks are formed from either isoprene or butadiene.

The present invention also encompasses polymers which have midblocks formed of monoalkenyl aromatic hydrocarbon monomers, preferably styrene. In this situation, the A blocks would be conjugated dienes containing di-, tri- and/or tetra-substituted olefinic double bonds and the B blocks would be formed of the monoalkenyl aromatic hydrocarbon. This type of polymer is not a rubbery polymer, but rather is hard and rigid. This type of polymer can be cured in situ to give a material with reinforcing crosslinks.

Useful randomly epoxidized star polymers are described in U.S. Pat. No. 5,247,026, entitled "Randomly Epoxidized Small Star Polymers," which is herein incorporated by reference. That application describes randomly epoxidized star polymers, based on at least one conjugated diolefin monomer, that contained di-, tri- and/or tetrasubstituted olefinic epoxides. The star polymers have greater than three arms or branches. Each arm has a molecular weight from 1000 to 15,000 and the concentration of di-, tri-, or tetrasubstituted olefinic epoxides (1,1-disubstituted, 1,2-disubstituted, 1,1,2-trisubstituted and 1,1,2,2-tetrasubstituted olefinic epoxides) is from 0.05 to 5 milli-equivalents of epoxide per gram of polymer.

Other functionalized polymers which can advantageously be used according to the present invention include low molecular weight star polyols. Such polyols include polymers which have only one hydroxy group at the end of each polymer arm and also polymers which have up to 5 hydroxy groups on each polymer arm. Other functionalized polymers which can be used have one carboxy, amine or phenolic group at the end of each arm. Alternatively, the hydroxy, carboxy, amine or phenolic functional group may be attached to the coupling agent.

In general, any of the solvents known in the prior art to be useful in the preparation of such polymers may be used. Suitable solvents, then, include straight- and branched chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as alkyl-substituted derivatives thereof; aromatic and alkyl-substituted derivatives thereof; aromatic and alkyl-substituted aromatic hydrocarbons such as benzene, napthalene, toluene, xylene and the like; hydrogenated aromatic hydrocarbons such as tetralin, decalin and the like; linear and cyclic ethers such as methyl ether, methylethyl ether, diethyl ether, tetrahydrofuran and the like.

More specifically, the polymers of the present invention are made by the anionic polymerization of conjugated diene monomers and alkenyl aromatic hydrocarbon monomers in a hydrocarbon solvent at a temperature between 0° and 100° C. using an alkyl lithium initiator. The living polymer chains are usually coupled by addition of divinyl monomer to form a star polymer. Additional monomers may or may not be added to grow more branches or to terminally functionalize the polymer and the living chain ends are quenched with a proton source.

Diblock molecular weights are conveniently measured by Gel Permeation Chromatography (GPC), where the GPC system has been appropriately calibrated. Polymers of known molecular weight are used to calibrate and these must be of the same molecular structure and chemical composition as the unknown diblock polymers that are measured. For anionically polymerized diblock polymers, diblock polymer is essentially monodisperse and it is both convenient and adequately descriptive to report the "peak" molecular weight of the narrow molecular weight distribution observed. Measurement of the true molecular weight of the final coupled star polymer is not as straightforward or as easy to make using GPC. This is because the star shaped molecules do not separate and elute through the packed GPC columns in the same manner as do the linear polymers used for the calibration, and, hence, the time of arrival at a UV or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wave length and in the same solvent used for the light scattering. The following references are herein incorporated by reference:

1. *Modern Size-Exclusion Liquid Chromatography*, W. W. Yau, J. J. Kirkland, D. D. Bly, John Wiley & Sons, New York, N.Y., 1979.
2. *Light Scattering from Polymer Solution*, M. B. Huglin, ed., Academic Press, New York, N.Y., 1972.
3. W. Kaye and A. J. Havlik, *Applied Optics*, 12, 541 (1973).
4. M. L. McConnell, *American Laboratory*, 63, May, 1978.

Preferably, the polymer is epoxidized under conditions that enhance the epoxidation of the more highly substituted olefinic double bonds, such as by the use of peracetic acid, wherein the rate of epoxidation is generally greater the greater the degree of substitution of the olefinic double bond (rate of epoxidation: tetrasubstituted > trisubstituted > disubstituted > monosubstituted olefinic double bond). Sufficient epoxidation is done to achieve the desired level of epoxidation in the polymer. $^1$H NMR can be used to determine the loss of each type of double bond and the appearance of epoxide.

If a substantially saturated polymer is desired, the epoxidized polymer is hydrogenated to remove substantially all remaining olefinic double bonds (ODB) and normally leaving substantially all of the aromatic double bonds. Alternatively, selective partial hydrogenation of the polymer may be carried out before epoxidation such that from 0.05 to 5 Meq of olefinic double bonds are left intact for subsequent epoxidation. In this case, the unsaturated polymer may be partially hydrogenated in a selective manner with a suitable catalyst and conditions (like those in U.S. Pat. No. Re 27,145, U.S. Pat. No. 4,001,199 or with a titanium catalyst such as is disclosed in U.S. Pat. No. 5,039,755, all of which are incorporated by reference; or by fixed bed hydrogenation) that favor the hydrogenation of the less substituted olefinic double bonds (rate or hydrogenation: monosubstituted > disubstituted > tri-substituted > tetrasubstituted olefinic double bonds) and also leaves aromatic double bonds intact, so as to leave some of the unsaturation intact in the A blocks (and/or any portions of B block, that may also contain unepoxidized higher substituted olefinic double bonds). The epoxidation does not need to be selective with respect to the degree of substitution on the olefinic double bonds, since the objective is usually to epoxidize as many of the remaining ODB's as possible.

Generally, if a hydrogenation step is used, sufficient improvement of the polymer's chemical and heat stability should be achieved to justify the extra expense and effort involved. For greatest heat stability, all of the olefinic double bonds, anyplace in the polymer, that are not epoxidized should be removed so that less than 1 Meq of ODB per gram of polymer remain, more preferably less than 0.6 Meq/g, and most preferably less than about 0.3 Meq/g of polymer.

The epoxidized copolymers of this invention can be prepared by the epoxidation procedures as generally described or reviewed in the *Encyclopedia of Chemical Technology* 19, 3rd ed., 251–266 (1980), D. N. Schulz, S. R. Turner, and M. A. Golub, *Rubber Chemistry and Technology*, 5, 809 (1982), W-K. Huang, G-H. Hsuie, and W-H. Hou, *Journal of Polymer Science, Part A: Polymer Chemistry*, 26, 1867 (1988), and K. A. Jorgensen, *Chemical Reviews*, 89, 431 (1989), and Hermann, Fischer, and Marz, *Angew. Chem. Int. Ed. Engl.* 30 (No. 12), 1638 (1991), all of which are incorporated by reference.

For instance, epoxidation of the base polymer can be effected by reaction with organic peracids which can be preformed or formed in situ. Suitable preformed peracids include peracetic and perbenzoic acids. In situ formation may be accomplished by using hydrogen peroxide and a low molecular weight fatty acid such as formic acid. Alternatively, hydrogen peroxide in the presence of acetic acid or acetic anhydride and a cationic exchange resin will form a peracid. The cationic exchange resin can optionally be replaced by a strong acid such as sulfuric acid or p-toluenesulfonic acid. The epoxidation reaction can be conducted directly in the polymerization cement (polymer solution in which the polymer was polymerized) or, alternatively, the polymer can be redissolved in an inert solvent such as toluene, benzene, hexane, cyclohexane, methylenechloride and the like and epoxidation conducted in this new solution or can be epoxidized neat. Epoxidation temperatures on the order of 0° to 130° C. and reaction times from 0.1 to 72 hours may be utilized. When employing hydrogen peroxide and acetic acid together with a catalyst such as sulfuric acid, the product can be a mixture of epoxide and hydroxy ester. The use of peroxide anti formic acid in the presence of a strong acid may result in diolefin polymer blocks containing both epoxide and hydroxy ester groups. Due to these side reactions caused by the presence of an acid, it is preferable to carry out the epoxidation at the lowest possible temperature and for the shortest time consistent with the desired degree of epoxidation. Epoxidation may also be accomplished by treatment of the polymer with hydroperoxides or oxygen in the presence of transition metals such as Mo, W, Cr, V and Ag, or with methyl-trioxorhenium/hydrogen peroxide with and without amines present. $^1$H NMR is an effective tool to determine which and how much of each type of ODB is epoxidized. Further, the amount of epoxy can also be measured by the direct titration with perchloric acid (0.1N) and quaternary ammonium halogenide (tetraethylammonium bromide) where the sample is dissolved in methylene chloride. Epoxy titration is described in *Epoxy Resins Chemistry and Technology*, edited by Clayton A. May and published in 1988 (p. 1065) which is herein incorporated by reference.

Epoxidation may also be accomplished by treatment of the polymer with hydroperoxides in the presence of transition metals such as Mo, W, Cr, V and Ag. Epoxy functionality may also be created by direct oxidation of ethylenic unsaturation by $O_2$ in the presence of tetra cyanoethylene. A temperature of about 150° C. and an oxygen partial pressure of about 58 atmospheres is suitable for this reaction.

The star polymer compositions of this invention are preferably cured by ultraviolet or electron beam radiation, but radiation curing utilizing a wide variety of electromagnetic wavelength is feasible. Either ionizing radiation such as alpha, beta, gamma, X-rays and high energy electrons or non-ionizing radiation such as ultraviolet, visible, infrared, microwave and radio frequency may be used.

The most common source of alpha, beta and gamma radiation are radioactive nuclei. A ionizing radiation source with commercial polymer crosslinking application is gamma radiation that is produced from either cobalt-60 or cesium-137 radioactive nuclei. X-rays can be produced through deacceleration of high speed electrons through the electric field of an atomic nucleus.

High voltage electron accelerators are preferred over gamma radiation and certain types of X-ray processing equipment. High energy electrons produced by machine acceleration, as opposed to radioisotopes, can be applied easily to industrial processes for the following reasons: easy on-off switching capability; less shielding is required than with gamma radiation; accelerator beams are directional and less penetrating than gamma or X-rays; and electron radiation provides high dose rates, i.e. maximum penetration per unit density of material, and is well suited for on-line, high speed processing applications. Commercially available high or low energy electron-processing equipment are the Dynamitron ® device, dynacote, insulating-core transformer, linear accelerator, Van de Graaff accelerator, pelletron, laddertron and linear cathode. Manufacturers of high voltage electron-accelerator equipment are High Voltage Engineering Corporation, Burlington, Mass. and Radiation Dynamics, Inc., Westbury, N.Y. Manufacturers of low energy electron beam generating equipment include American International Technologies, Inc., of Torrance, Calif.; RPC Industries of Hayward, Calif.; and Energy Sciences of Wilmington, Mass.

Ultraviolet light sources may be based on the mercury-vapor arc. Mercury is enclosed in a quartz tube and a potential is applied to electrodes at either end of the tube. The electrodes can be of mercury, iron, tungsten or other metals. The pressure in the mercury-vapor lamp may be less than 1 atm to more than 10 atm. As the mercury pressure and lamp operating temperatures are increased, the radiation becomes more intense and the width of the emission lines increases. Other UV light sources include electrodeless lamps, Xenon lamps, pulsed Xenon lamps, Argon ion lasers and Excimer lasers.

Visible light sources can be obtained from high pressure mercury arcs by addition of rare gases or metal halides, which increase the number of emission lines in the 350–600 nm region of the spectrum. Fluorescent lamps, tungsten halide lamps and visible lasers may also be utilized.

The mechanism of the radiation crosslinking is believed to be generation of cations by removal of an electron from the polymer chain. The cation then readily reacts with an epoxy group, if an epoxy group is available. This reaction results in an ether crosslink between two polymer molecules and a new cation site on a polymer which formerly contained the epoxy functionality. The new cation will either propagate, forming another either crosslink with another epoxy oxygen, or terminate by recapturing an electron.

The presence of water in the polymer composition during the radiation crosslinking is very undesirable due to the tendency of water to terminate the crosslinking. The radiation curing is therefore generally more effective if the polymeric composition is at a temperature near or above the boiling point of water at the time of the radiation curing.

The amount of radiation necessary for high gel formation varies with the thickness of the polymeric mass being irradiated, the amount of epoxy functionality, the extent to which the epoxy functionality is concentrated in specific regions within the polymeric mass and the type of radiation utilized. When electron beam radiation is utilized, radiation doses of 0.1 Mrads to 5 Mrads are preferred.

When using non-ionizing radiation it is necessary to employ a photoinitiator to initiate the crosslinking reaction. Useful photoinitiators include diaryl iodonium, alkoxy-substituted diaryl iodonium, triarylsulfonium, dialkylphenacylsulfonium, and dialkyl-4-hydrophenylsulfonium salts. The anions in these salts generally possess low nucleophilic character and include $SbF_6-$, $BF_4-$, $BF_4-$, $PF_6-$ and $AsF_6-$. Specific examples include (4-octyloxyphenyl)-phenyl-iodium hexafluoroantimonate, UVI-6990 (from Union Carbide), and FX-512 (3M Company). UVI-6974, an aryl sulfonium salt from Union Carbide, is especially effective as is UV 9310 C (from General Electric). The salts can be used alone or in conjunction with a photosensitizer to respond to long wave length UV and visible light. Examples of photosensitizers include thioxanthone, anthracene, perylene, phenothiazione, 1,2-benzathracene coronene, pyrene and tetracene. The photoinitiator and photosensitizer are chosen to be compatible with the polymer being crosslinked and the light source available.

Radiation induced cationic curing may also be done in combination with free radical curing. Free radical curing can be further enhanced by the addition of additional free radical photoinitiators and photosensitizers for them.

Reactive (radiation curable) diluents that can be added to the polymer include alcohols, vinyl ethers, epoxides, acrylate and methacrylate monomers, oligomers and polymers. They may also be blended with other diene-based polymers. Examples of epoxides include bis(2,3-epoxy cyclopentyl)ether, vinyl cyclohexene dioxide, limonene dioxide, epoxidized soya, cycloaliphatic epoxies such as 3,4-epoxycyclohexylmethyl-3,4-epoxycyclohexane carboxylate (Union Carbide's Cyracure UVR 6110), and linseed oils and fatty acids and vernonia oil.

The polymer composition may also be cured without the use of radiation by addition of a cationic initiator. Suitable initiators include the halides of tin, aluminum, zinc, boron, silicon, iron, titanium, magnesium and antimony, and the fluoroborates of many of these metals. $BF_3$ complexes such as $BF_3$-ether and $BF_3$-amine are included. Also useful are strong Bronsted acids such as trifluoromethanesulfonic (triflic acid) and the salts of triflic acid such as FC-520 (3M Company). The cationic initiator is chosen to be compatible with the polymer being crosslinked, the method of application and cure temperature. The polymer compositions may also be crosslinked by the addition of multifunctional carboxylic acids, acid anhydrides, and alcohols, and in general by the curing methods described in U.S. Pat. No. 3,970,608, which is incorporated by reference. Volatile amines can be used to inhibit or retard unwanted cure, such as to maintain fluidity in one pack formulations until they are applied and reach the appropriate bake temperature for cure. Radiation crosslinking is preferred because reactive ingredients do not come in contact with warm adhesives.

The materials of the present invention are most useful in inks, coatings and adhesives (including pressure sensitive adhesives, contact adhesives, laminating adhesives and assembly adhesives), but they are also useful in sealants, films (such as those requiring heat and solvent resistance), etc. However, it may be necessary for a formulator to combine a variety of ingredients together with the polymers of the present invention in order to obtain products having the proper combination of properties (such as adhesion, cohesion, durability, low cost, etc.) for particular applications. Thus, a suitable formulation might contain only the compositions of the present invention and the curing agent. However, in most coating and sealant applications, suitable formulations would also contain various combinations of resins, plasticizers, fillers, solvents, stabilizers and other ingredients such as asphalt. The following are some typical examples of formulations for coatings and sealants.

In coatings and sealant applications, as well as in adhesives, it may be necessary to add an adhesion promoting or tackifying resin that is compatible with the polymer composition. A common tackifying resin is a diene-olefin copolymer of piperylene and 2-methyl-2-butene having a softening point of about 95° C. This resin is available commercially under the tradename Wingtack ® 95 and is prepared by the cationic polymerization of 60% piperlene, 10% isoprene, 5% cyclopentadiene, 15% 2-methyl-2-butene and about 10% dimer, as taught in U.S. Pat. No. 3,577,398. Other tackifying resins may be employed wherein the resinous copolymer comprises 20-80 weight percent of piperylene and 80-20 weight percent of 2-methyl-2-butene. The resins normally have ring and ball softening points as determined by ASTM method E28 between about 80° C. and 115° C.

Aromatic resins may also be employed as tackifying agents, provided that they are compatible with the particular polymer used in the formulation. Normally, these resins should also have ring and ball softening points between about 80° C. and 115° C. although mixtures of aromatic resins having high and low softening points may also be used. Useful resins include coumarone-indene resins, polystyrene resins, vinyl toluene-alpha methylstyrene copolymers and polyindene resins.

Other adhesion promoting resins which are also useful in the compositions of this invention include hydrogenated rosins, esters of rosins, polyterpenes, terpene-phenol resins and polymerized mixed olefins, lower softening point resins and liquid resins. An example of a liquid resin is Adtac ® LV resin from Hercules. To obtain good thermo-oxidative and color stability, it is preferred that the tackifying resin be a saturated resin, e.g., a hydrogenated dicyclopentadiene resin such as Escorez ® 5000 series resin made by Exxon or a hydrogenated polystyrene or polyalphamethylstyrene resin such as Regalrez ® resin made by Hercules. The amount of adhesion promoting resin employed varies from 0 to 400 parts by weight per hundred parts rubber (phr), preferably between 20 to 350 phr, most preferably 20 to 150 phr. The selection of the particular tackifying agent is, in large part, dependent upon the specific polymer employed in the respective adhesive composition.

A composition of the instant invention may contain plasticizers, such as rubber extending plasticizers, or compounding oils or organic or inorganic pigments and dyes. Rubber compounding oils are well-known in the art and include both high saturates content oils and high aromatics content oils. Preferred plasticizers are highly saturated oils, e.g. Tufflo ® 6056 and 6204 oil made by Arco and process oils, e.g. Shellflex ® 371 oil made by Shell. The amounts of rubber compounding oil employed in the invention composition can vary from 0 to about 500 phr, preferably between about 0 to about 100 phr, and most preferably between about 0 and about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition.

Various types of fillers and pigments can be included in the coating or sealant formulation. This is especially true for exterior coatings or sealants in which fillers are added not only to create the desired appeal but also to improve the performance of the coatings or sealant such as its weatherability. A wide variety of fillers can be used. Suitable fillers include calcium carbonate, clays, talcs, silica, zinc oxide, titanium dioxide and the like. The amount of filler usually is in the range of 0 to about 65% w based on the solvent free portion of the formulation depending on the type of filler used and the application for which the coating or sealant is intended. An especially preferred filler is titanium dioxide.

If the coating or sealant will be applied from solvent solution, the organic portion of the formulation will be dissolved in a solvent or blend of solvents. Aromatic hydrocarbon solvents such as toluene, xylene, or Shell Cycolo Sol 53 are suitable. Aliphatic hydrocarbon solvents such as hexane, naphtha or mineral spirits may also be used. If desired, a solvent blend consisting of a hydrocarbon solvent with a polar solvent can be used. Suitable polar solvents include esters such as isopropyl acetate, ketones such as methyl isobutyl ketone, and alcohols such as isopropyl alcohol. The amount of polar solvent used depends on the particular polar solvent chosen and on the structure of the particular polymer used in the formulation. Usually, the amount of polar solvent used is between 0 and 50% w in the solvent blend.

Combinations of primary and secondary antioxidants are preferred. Such combinations include sterically hindered phenolics with phosphites or thioethers, such as hydroxyphenylpropionates with aryl phosphates or thioethers, or amino phenols with aryl phosphates. Specific examples of useful antioxidant combinations include 3-(3,5-di-t-butyl-4-hydroxyphenyl) propionate)methane (Irganox ® 1010 from Ciba-Geigy) with tris(nonylphenyl)phosphite (Polygard ® HR from Uniroyal), Irganox ® 1010 with bis(2,4-di-t-butyl)pentaerythritol diphosphite (Ultranox ® 626 from Borg-Warner).

Additional stabilizers known in the art may also be incorporated into the composition. These may be for protection during the life of the article against, for example, oxygen, ozone and ultra-violet radiation. However, these additional stabilizers should be compatible with the essential stabilizers mentioned hereinabove and their intended function as taught herein.

All adhesive, coating and sealant compositions based on the polymer compositions of this invention will contain some combination of the various formulating ingredients disclosed herein. No definite rules can be offered about which ingredients will be used. The skilled formulator will choose particular types of ingredients and adjust their concentrations to give exactly the combination of properties needed in the composition for any specific adhesive, coating or sealant application.

The only two ingredients that will always be used in any adhesive, coating or sealant are the polymer composition and the curing agent (which may be radiation) if the composition is to be cured. There are many types of curing agents from which to choose. Beyond these two ingredients, the formulator will choose to use or not to use among the various resins, fillers and pigments, plasticizers, reactive oligomers, stabilizers and solvents.

Adhesives are frequently thin layers of sticky compositions which are used in protected environments (adhering two substrates together). Therefore, unhydrogenated polymers will usually have adequate stability so resin type and concentration will be selected for maximum stickiness without great concern for stability, and pigments will usually not be used.

Coatings are frequently thin, non-sticky, pigmented compositions applied on a substrate to protect or decorate it. Therefore, hydrogenated polymers may be needed to give adequate durability. Resins will be selected to assure maximum durability and minimum dirt pick-up. Fillers and pigment will be selected carefully to give appropriate durability and color. Coatings will frequently contain relatively high solvent concentration to allow easy application and give a smooth dry coating.

Sealants are gap fillers. Therefore, they are used in fairly thick layers to fill the space between two substrates. Since the two substrates frequently move relative to each other, sealants are usually low modulus compositions capable of withstanding this movement. Since sealants are frequently exposed to the weather, the hydrogenated polymers should usually be used. Resins and plasticizers will be selected to maintain low modulus and minimize dirt pick-up. Fillers and pigment will be selected to give appropriate durability and color. Since sealants are applied in fairly thick layers, solvent content is as low as possible to minimize shrinkage.

A formulator skilled in the art will see tremendous versatility in the epoxidized polymers of this invention to prepare adhesives, coatings and sealants having properties suitable for many different applications.

The adhesive, coating and sealant compositions of the present invention can be prepared by blending the components at an elevated temperature, preferably between about 50° C. and about 200° C., until a homogeneous blend is obtained, usually less than three (3) hours. Various methods of blending are known to the art and any method that produces a homogenous blend is satisfactory. The resultant compositions may then be used in a wide variety of applications. Alternatively, the ingredients may be blended into a solvent.

EXAMPLE 1

An epoxidized star polymer, polymer A was diluted with a co-reactive diluent to form a low viscosity liquid. The star polymer was made with the structure:

$$Y\text{-}(A^1\text{-}eI)_n$$

where Y is the divinyl benzene coupling agent and the arm consists of two blocks: $A^1$ is a 40% vinyl content polybutadiene of 4,940 molecular weight and eI is a block of epoxidized isoprene block of 860 molecular weight. There were 16% free arms and the total molecular weight of the polymer was 83,000 by light scattering. The total epoxy level is 2.27 meq per gram with ten times as many epoxy groups in the eI block as compared to the $A^1$ block. The co-reactive diluent was a UV curable; cycloaliphatic diepoxide 3,4-epoxycyclohexylmethyl-3,4 epoxy-cyclohexane-carboxylate (Union Carbide's Cyracure UVR6110). The viscosity of the blends is listed in Table 1.

For comparison purposes an epoxidized linear isoprene homopolymer, polymer B, was diluted with a co-reactive diluent. A linear, narrow molecular weight distribution polyisoprene of 29,000 molecular weight was used. The polymer was epoxidized to a level of 2.6 meq/gram. This polymer was blended with UVR6110 at various levels. The viscosity of these blends is compared to the blends for polymer A described above in Table 1. To provide a more direct comparison columns 3 and 5 were divided by the viscosity of the polymers with no reactive diluent (normalized).

TABLE 1

| UVR6110 % | Polymer A Viscosity (poise) | Polymer A Norm | Polymer B Viscosity (poise) | Polymer B Norm |
|---|---|---|---|---|
| 0 | 12,100 | 1 | 1,750 | 1 |
| 6.4 | 8,120 | 0.671 | | |
| 6.9 | | | 1,600 | 0.914 |
| 9.09 | 7,170 | 0.593 | | |
| 11.7 | | | 3,200 | 1.83 |
| 11.7 | | | 2,200 | 1.26 |
| 24.3 | | | 1,200 | 0.686 |
| 25.9 | 3,190 | 0.263 | | |
| 50.0 | 892 | 0.0737 | | |
| 50.5 | | | 440 | 0.251 |

It can be seen that the viscosity of the star polymer drops much faster than that of the linear polymer as the amount of co-reactive diluent is increased. It is believed that the viscosities for the two samples at 11.7 percent are high because some curing of the blends occurred.

EXAMPLE 2

Polymer A of example 1 was diluted with toluene. For comparison, polymer B of example 1 was also diluted with toluene. The data appears in Table 2.

TABLE 2

| Toluene % | Polymer A Viscosity (poise) | Polymer A Norm | Polymer B Viscosity (poise) | Polymer B Norm |
|---|---|---|---|---|
| 0 | 12,100 | 1 | 1,750 | 1 |
| 5.2 | 3,980 | 0.329 | | |
| 6.83 | | | 980 | 0.56 |
| 10.5 | 1,460 | 0.121 | | |
| 12.6 | | | 398 | 0.227 |
| 20.0 | | | 97.1 | 0.0554 |
| 25.4 | 131 | 0.011 | | |
| 39.1 | | | 22.3 | 0.0127 |
| 51.1 | 19.1 | 0.00158 | | |

Again, the viscosity of the star polymer decline much more rapidly than that of the linear polymer as solvent is added.

EXAMPLE 3

A star polymer, polymer C, was diluted with a typical aliphatic solvent, cyclohexane, to form a low viscosity liquid. The star polymer was made with the structure:

$$Y\text{-}(EB\text{-}I)_n$$

where Y is the divinyl benzene coupling agent and the arm consists of two blocks: EB is a fully hydrogenated 40% vinyl content polybutadiene of 4,680 molecular weight and I is an isoprene block of 920 molecular weight. There were 40% free arms and the total molecular weight of the polymer was 77,000 by light scattering.

For comparison, a linear polymeric diol, polymer D, was diluted with a typical hydrocarbon solvent, cyclohexane. The linear polymer was a hydrogenated polybutadiene diol of approximately 4,000 molecular weight. The data are shown in Table 3 and plotted in FIG. 1.

TABLE 3

| Cyclohexne % | Polymer C Viscosity (poise) | Polymer C Norm | Polymer D Viscosity (poise) | Polymer D Norm |
|---|---|---|---|---|
| 0 | 4,450 | 1 | 448 | 1 |

TABLE 3-continued

| Cyclohexne % | Polymer C Viscosity (poise) | Polymer C Norm | Polymer D Viscosity (poise) | Polymer D Norm |
|---|---|---|---|---|
| 5 | 1,400 | 0.315 | 220 | 0.491 |
| 15 | 130 | 0.0292 | 49.8 | 0.111 |
| 40 | 19 | 0.0043 | 2.6 | 0.0058 |

The data in Table 1, 2 and 3 and FIG. 1 show that the viscosity of the star polymers decreases much more rapidly with the addition of diluents such as solvents and coreactants than does the viscosity of linear polymers.

We claim:

1. A crosslinkable composition having a viscosity of less than 12,000 poise and comprising a star polymer having arms with a peak molecular weight as measured by gel permeation chromatography of from 1,000 to 15,000, said composition being made by anionically polymerizing a conjugated diene and, optionally, a vinyl aromatic hydrocarbon to form living polymer arms and coupling said arms with a coupling agent for star polymers and blending said star polymer with a compatible organic liquid such that the amount of organic liquid in the blend ranges from 5 to 15 percent by weight.

2. The star polymer composition of claim 1 wherein the polymer is functionalized with a functional group selected from the group consisting of epoxy, hydroxy, carboxy, amine and phenolic.

3. A crosslinkable composition having a viscosity of less than 12,000 poise and comprising a epoxidized star polymer having arms with a peak molecular weight as measured by gel permeation chromatography of from 1,000 to 15,000, said composition being made by anionically polymerizing a conjugated diene and, optionally, a vinyl aromatic hydrocarbon to form living polymer arms and coupling said arms with a coupling agent for star polymers, epoxidizing the resulting polymer and blending the epoxidized star polymer with a compatible organic liquid such that the amount of organic liquid in the blend ranges from 5 to 15 percent by weight.

4. The epoxidized star polymer composition of claim 3 wherein the polymer is comprised of at least one exterior block and at least one interior block wherein the exterior blocks contain a greater concentration of di-, tri-, or tetrasubstituted olefinic epoxides than the interior blocks.

5. The star polymer composition of claim 4 wherein the polymer has the formula $$(A\text{-}B\text{-}A_p)_n\text{-}Y\text{-}(A_q\text{-}B)_m$$

wherein Y is a coupling agent or coupling monomers, and wherein A and B are polymer blocks which are selected from the group consisting of homopolymer blocks of conjugated diolefin monomers, copolymer blocks consisting of conjugated diolefin blocks and copolymer blocks of conjugated diolefin monomers and monoalkenyl aromatic hydrocarbon monomers, and wherein the A blocks have a greater number of di-, tri- and tetra-substituted olefinic epoxides per unit of block mass than do the B blocks, and wherein the A blocks have a peak molecular weight as measured by gel permeation chromatography from 100 to 3000 and the B blocks have a peak molecular weight as measured by gel permeation chromatography from 1000 to 15,000, and wherein p and cl are 0 or 1 and $n > 0$, $m \geq 0$ and $n + m$ ranges from 3 to 100; and wherein the polymer is epoxidized such that 0.1 to 3 Meq/g of epoxide is present.

6. A coating comprising the composition of claim 1.
7. A coating comprising the composition of claim 3.
8. An adhesive comprising the composition of claim 3.

* * * * *